US008500829B2

(12) United States Patent
Siskin et al.

(10) Patent No.: US 8,500,829 B2
(45) Date of Patent: Aug. 6, 2013

(54) BIOMASS OIL CONVERSION USING CARBON MONOXIDE AND WATER

(75) Inventors: Michael Siskin, Westfield, NJ (US); Glen E. Phillips, Goldvein, VA (US); Simon R. Kelemen, Annandale, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 339 days.

(21) Appl. No.: 13/038,093

(22) Filed: Mar. 1, 2011

(65) Prior Publication Data

US 2011/0232163 A1    Sep. 29, 2011

Related U.S. Application Data

(60) Provisional application No. 61/317,579, filed on Mar. 25, 2010, provisional application No. 61/317,573, filed on Mar. 25, 2010.

(51) Int. Cl.
*C10L 1/00* (2006.01)
(52) U.S. Cl.
USPC ............ 44/605; 44/307; 44/308; 44/606; 585/240; 585/242; 585/357; 585/408; 585/638; 585/733
(58) Field of Classification Search
USPC ............ 44/307–308, 605–606; 585/240, 585/242, 357, 408, 638, 733
See application file for complete search history.

(56) References Cited

U.S. PATENT DOCUMENTS

| | | | |
|---|---|---|---|
| 3,689,240 A | 9/1972 | Aldridge et al. | |
| 4,337,142 A | 6/1982 | Knudson et al. | |
| 4,605,762 A | 8/1986 | Mandoki | |
| 5,151,173 A | 9/1992 | Vaughn et al. | |
| 5,338,442 A | 8/1994 | Siskin et al. | |
| 2004/0040174 A1* | 3/2004 | Childs | 34/380 |
| 2008/0016769 A1* | 1/2008 | Pearson | 48/197 R |

OTHER PUBLICATIONS

Keenan et al., "CRC Handbook of Chemistry and Physics and Steam Tables", Wiley-Interscience, New York (1969).
Franck, "Fluids at High Pressures and Temperatures", Journal of Chemical Therrmodynamics, vol. 19, pp. 225-242 (1987).
Siskin et al., "Reactivity of Organic Compounds in Hot Water: Geochemical and Technological Implications", Science, Articles, vol. 254, pp. 231-237 (Oct. 11, 1991).
Siskin et al., "Asphaltene Molecular Structure and Chemical Influences on the Morphology of Coke Produced in Delayed Coking", Energy & Fuels, vol. 20, pp. 1227-1234 (2006).
Demirbas, "Thermochemical Conversion of Biomass to Liquid Products in the Aqueous Medium", Energy Sources, vol. 27, pp. 1235-1243 (2005).
Baltisberger et al., "Carbon Monoxide-Water vs. Hydrogen for Liquefaction: The Reduction of Diphenylsulfide, Thioanisole and Dibenzothiophene", Department of Chemistry, University of North Dakota, Grand Forks, ND 58202, pp. 74-79.
Breslow, "Hydrophobic Effects on Simple Organic Reations in Water", Accounts of Chemical Research, vol. 24, No. 6, pp. 159-164 (Jun. 1991).
Elliott et al., "Liquid Hydrocarbon Fuels From Biomass", American Chemical Society, Division of Fuel Chemistry, Preprints, vol. 34, No. 4, pp. 1160-1166 (1989).
Siskin et al., Aqueous Organic Chemistry, 5. Diaryl Ethers: Diphenyl Ether, 1-Phenoxynaphthalene and 9-Phenoxyphenanthrene, Fuel, vol. 72, No. 10, pp. 1435-1444 (1993).
Campbell et al., "Polyurethane Foam Recycling Superheated Steam Hydrolysis", Environmental Science & Technology, vol. 10, No. 2, pp. 182-185 (Feb. 1976).
Pitzer, "Dielectric Constant of Water at Very High Temperature and Pressure", Proceeding of the National Academy of Sciences USA, vol. 80, pp. 4575-4576 (1983).
Ringer et al., Large-Scale Pyrolysis Oil Production: A Technology Assessment and Economic Analyis, Technical Report NREL/TP-510-37779 (Nov. 2006).
Appell et al., "Coal Liquefaction With Synthesis Gas", Pittsburgh Energy Technology Center, Pittsburgh, Pennsylvania, (Sep. 1979).
Rocha et al., "The Scope for Generating Bio-Oils With Relatively Low Oxygen Contents Via Hydropyrolysis", Organic Geochemistry, vol. 30, pp. 1527-1534 (1999).
Matsumura et al., "Supercritical Water Treatment of Biomass for Energy and Material Recovery", Combustion Science and Technology, vol. 178, pp. 509-536, (2006).
Stenberg et al., "Carbon Monoxide-Hydrogen-Water: Reduction of Anthracene, Dihydroanthracene, and Quinoline", Journal of Organic Chemistry, vol. 43, No. 15, pp. 2991-2994 (1978).
Boocock et al., "The Liquefaction of Poplar by Rapid Aqueous Pyrolysis: Results From Semi-Continuous and Batch Units", Department of Chemical Engineering, University of Toronto, Toronto, Ontario, M5S 1A4, pp. 450-454.
Kinstle et al., "Chemical Intermediates From Scrap Polymers Via Hydrolysis", Department of Chemistry, University of Tennessee, Knoxville, TN 37996, pp. 446-447.
Akerlof et al., "The Dielectric Constant of Water at High Temperatures and in Equilibrium With Its Vapor", Koppers Company Research Fellowship, Mellon Institute and the Department of Physics, University of Pittsburgh, vol. 72, pp. 2844-2847 (Jul. 1950).
Scott et al., "The Continuous Flash Pyrolysis of Biomass", The Canadian Journal of Chemical Engineering, vol. 62, pp. 404-412 (Jun. 1984).
Davis et al., "The Chemistry and Stoichiometry of Wood Liquefaction", Biotechnology and Bioengineering Symposium, No. 11, pp. 151-169 (1981).
Schaleger et al., "Direct Liquefaction of Biomass: Results From Operation of Continuous Bench-Scale Unit in Liquefaction of Water Slurries of Douglas Fir Wood", Biotechnology and Bioengineering Symposium, No. 12, pp. 3-14 (1982).
Gregoire et al., "Technoeconomic Analysis of the Production of Biocrude From Wood", Biomass and Bioenergy, vol. 7, Nos. 1-6, pp. 275-283 (1994).

* cited by examiner

*Primary Examiner* — Brian McCaig
(74) *Attorney, Agent, or Firm* — Glenn T. Barrett; Malcolm D. Keen

(57) ABSTRACT

A pyrolysis oil derived from a lignocellulosic biomass material is converted into precursors for liquid hydrocarbon transportation fuels by contacting the oil with water and carbon monoxide at elevated temperature, typically from 280 to 350° C., an elevated pressure, typically a total system pressure of 12 to 30 MPa and a CO partial pressure from 5 to 10 MPa and a weight ratio of water:biomass oil from 0.5:1 to 5.0:1, to dissolve the oil into the reaction mixture and depolymerize, deoxygenate and hydrogenate the oil, so converting it into liquid transportation fuel precursors.

17 Claims, No Drawings

BIOMASS OIL CONVERSION USING CARBON MONOXIDE AND WATER

CROSS REFERENCE TO RELATED APPLICATIONS

This application relates and claims priority to U.S. Provisional Patent Application No. 61/317,579, filed on Mar. 25, 2010. This application is also related to co-pending U.S. patent application Ser. No. 13/038,060, entitled "Biomass Conversion using Carbon Monoxide and Water", filed on Mar. 1, 2011, which claims priority to U.S. Provisional Patent Application No. 61/317,573, filed on Mar. 25, 2010.

FIELD OF THE INVENTION

The present invention relates to a process for the production of transportation fuels by the conversion of biomass pyrolysis oil.

BACKGROUND OF THE INVENTION

Petroleum is currently estimated to account for over 35% of the world's total commercial primary energy consumption. Coal ranks second with 23% and natural gas third with 21%. The use of liquid hydrocarbon fuels on an enormous scale for transportation has led to the depletion of readily accessible petroleum reserves in politically stable regions and this, in turn, has focused attention, economically, technically and politically on the development of alternative sources of liquid transportation fuels. Liquid hydrocarbons are far and away the most convenient energy sources for transportation in view of their high volumetric energy. The energy density of gasoline, for example at about 9 kWh/liter and of road diesel at about 11 kWh/liter, far exceeds that of hydrogen (1.32 kWh/liter at 680 atm, or batteries, 175 Wh/kg. Furthermore, the liquid hydrocarbon fuel distribution infrastructure is efficient and already in place.

Conversion of coal into liquid hydrocarbon fuels has been used in the past in various countries to supplement or replace imported petroleum fuels, most notably by Germany during World War II when the Bergius and Fischer-Tropsch processes were used on a large scale and in the sporadically in the United States when petroleum crude prices were considered to have reached politically excessive levels. Processes for using large coal reserves have received attention in the United States, both in the direction of enabling coal to be burned with lower pollution emissions, e.g., Solvent Refined Coal, and in processes for converting coal into liquid fuels by alternative processes, for example, by the CO-Steam Process investigated at the Grand Forks Energy Research Center in North Dakota during a previous moment of national political panic. In this process, lignite is converted to boiler fuel by the reaction of a finely ground slurry of lignite in a hydrocarbon donor solvent with carbon monoxide, steam and hydrogen at about 450° C. and pressures up to about 35 MPa (5000 psi), as described in U.S. Pat. No. 4,337,142 (Knudson). Variants of this process subsequently considered but not brought to commercial use included the lower temperature aqueous-CO pretreatment process for low rank coals derived from terrestrial material, not significantly structurally different from lignin, peat and lignite coals. This process, described in U.S. Pat. No. 5,151,173 (Vaughan) significantly decreased the oxygen content of lignite and sub-bituminous (lower rank) coals, increased the H/C atomic ratio and increased the extractability of the coal without addition of molecular hydrogen. High pressures comparable to those used in the CO-Steam process were found to be necessary.

With the degree of attention being given currently, not so much to terrestrial petroleum shortage but, rather, to excess atmospheric greenhouse gases, the use of biomass as a source of liquid fuels is receiving widespread public and governmental attention and government subsidies for biomass research projects have become numerous. Biomass is considered to be desirable as a source of liquid fuels from biomass for the transportation sector because $CO_2$ released from vehicle exhaust is captured during biomass growth making the process essentially carbon neutral. While direct, carbon-neutral use of biomass as fuel is established, for example, biodiesel, this route is limited because the limited choice of source materials, e.g., vegetable oils. Conversion of a wider variety of biomass sources into more traditional types of fuel, principally hydrocarbons, is the more attractive option.

Currently, there are two major routes for conversion of biomass to liquid fuels: biological and thermo-chemical. In the biological process, fermentation of easily fermentable plant products, such as, for example, sugars to alcohols is achieved. These easily fermentable plant products can be extracted from corn kernels, sugar cane and etc. The major disadvantage of this pathway is that only a fraction of the total carbon in biomass is converted to the final desired liquid fuel. It has been calculated that conversion of all corn produced in USA to ethanol can meet 12% of entire US demand for gasoline which reduces to 2.4% after accounting for fossil fuel input required to produce the ethanol. Similarly, an approximate estimate for the land area required to support the current oil consumption of about 2 million cubic meters per day by the US transportation sector is of the order of 2.67 million square km which represents 29% of the total US land area, using reasonable assumptions for the efficiency of the conversion process, thus suggesting that large scale production of liquid fuels from such a biomass conversion process is impractical.

While other processes for converting biomass to liquid fuels have been proposed, none has so far achieved large scale commercial success. Various problems exist, including major capital and operating expenses including high energy input requirements making the overall conversion unattractive and the need to use large process units to gain any reasonable production rate. Economics has therefore played a significant role in inhibiting the adoption of biomass conversion processes but since substitution of a part of the transportation fuel demand by biological materials would constitute a worthwhile economic, political and environmental advance, consideration is being given to various approaches.

Biomass oil provides one of the options which are being considered as a source of synthetic petroleum substitutes for fuel uses. It may be extracted by biomass-to-liquid technology involving destructive distillation of dried biomass in a reactor at temperature of about 500° C. with subsequent cooling. Biomass oil produced by rapid pyrolysis has been produced commercially on a small scale. Pyrolysis oil is a kind of tar and normally contains high levels of oxygen which preclude it from being considered as a direct hydrocarbon substitute. It is hydrocarbon insoluble, viscous, contains upwards of 20 wt % water along with 40-50 wt % organic oxygen compounds that decrease the heating value, and is unstable because sediment is formed via e.g., phenol-formaldehyde resin forming reactions that lead to coke formation on heating. Biomass oil produced by hydrothermal liquefaction is a higher grade hydrocarbon soluble oil with only about 15 wt % oxygen-containing organic compounds. Previous attempts to commercialize this approach have failed due to the high water usage and inability to feed the biomass effectively into the processing unit.

SUMMARY OF THE INVENTION

We have now devised a process for the conversion of biomass oil into transportation fuel precursors which does not rely upon gasification and which uses cheap, readily available materials in the conversion.

According to the present invention, biomass oil, preferably one derived from a biomass precursor high in lignin content, i.e. derived from a high lignin lignocellulosic material, is converted into precursors for liquid hydrocarbon transportation fuels by the use of carbon monoxide and water at high temperatures. In a typical application of the process, the biomass oil is contacted with water and carbon monoxide at elevated temperature of 280 to 370° C., an elevated pressure total system pressure of 12 to 30 MPa, a CO partial pressure from 5 to 10 MPa and a weight ratio of water:biomass oil from 0.5:1 to 5.0:1. The biomass oil dissolves into the reaction mixture where reactions with water and the carbon monoxide take place to depolymerize, deoxygenate and hydrogenate the components of the oil and so form a reaction product comprising liquid transportation fuel precursors. Residual biomass may be allowed to enter the process along with the oil since the CO/water system is efficient to dissolve and convert the biomass in itself, as described in related U.S. Provisional Patent Application No. 61/317,573, entitled "Biomass Conversion using Carbon Monoxide and Water". The synthetic fuel precursors generated by the reaction may be worked up into synthetic hydrocarbon liquid and gaseous fuels for transportation and other uses by conventional processing schemes.

DETAILED DESCRIPTION

Biomass is conventionally defined as the living and recently dead biological material that can be converted for use as fuel or for industrial production. The criterion as biomass is that the material should be recently participating in the carbon cycle so that the release of carbon in the combustion process results in no net increase averaged over a reasonably short period of time (for this reason, fossil fuels such as peat, lignite and coal are not considered biomass by this definition as they contain carbon that has not participated in the carbon cycle for a long time so that their combustion results in a net increase in atmospheric carbon dioxide). Most commonly, biomass refers to plant matter grown for use as biofuel, but it also includes plant or animal matter used for production of fibers, chemicals or heat. Biomass may also include biodegradable wastes that can be burnt as fuel including municipal wastes, green waste (the biodegradable waste comprised of garden or park waste such as grass or flower cuttings and hedge trimmings), byproducts of farming including animal manures, food processing wastes, sewage sludge, black liquor from wood pulp or algae. Biomass excludes organic material which has been transformed by geological processes into substances such as coal, oil shale or petroleum. Biomass is widely and typically grown from plants, including miscanthus, spurge, sunflower, switchgrass, hemp, corn (maize), poplar, willow, sugarcane, and oil palm (palm oil) with the roots, stems, leaves, seed husks and fruits all being potentially useful. The particular plant or other biomass source used is not important to the product liquid transportation fuel although the processing of the raw material for introduction to the processing unit will vary according to the needs of the unit and the form of the biomass. The biomass materials which are preferred are those which contain a higher proportion of lignins relative to celluloses and hemicelluloses since it is the lignins which, in the water treatment, produce greater quantities of the fuel precursors. Since lignin plays a significant role in the carbon cycle, sequestering atmospheric carbon into the living vegetable, the use of the lignin derivatives as fuels will be carbon-neutral. Further, the conversion of lignin in biomass which contains higher organic oxygen concentrations would be more facile than with low rank coals. Biomass materials with high lignin content are the preferred materials for use in the present process; a lignin content of at least 35 percent would produce greater amounts of the pyrolysis oil while at least 50 percent lignin would be preferred, if feasible.

Initially, the biomass is converted by pyrolysis into an oily liquid along with biomass char or coke as by-products of the pyrolysis. The biomass materials which are preferred are those which contain a higher proportion of lignins relative to celluloses and hemicelluloses since it is the lignins which, upon pyrolysis, produce greater quantities of the oils which are then treated with the liquid or supercritical water. Since lignin plays a significant role in the carbon cycle, sequestering atmospheric carbon into the living vegetable, the use of the pyrolysis oil and its subsequent derivatives as fuels will be carbon-neutral; the celluloses and hemicelluloses produce char mostly or even exclusively. The pyrolysis of the biomass material involves heating the material in a reducing atmosphere with a limited oxygen supply, optionally with the addition of steam. In the fast pyrolysis of biomass, the material being treated is heated rapidly for only a few seconds, and this breaks it down into a large number of relatively small molecules. The resulting mixture is then cooled rapidly to prevent further reaction, giving a dark, oily liquid, known as bio oil or pyrolysis oil. Other products include char, mostly carbon solids, and a mixture of gases. Both of these can be used as fuels on site. Pyrolysis conditions will be selected according to the nature of the biomass but in general, temperatures from 300 to 500° C., typically 350 to 425° C. will normally be used; provided that the requisite conversion to the pyrolysis oil is achieved, the specific conditions used are not important.

The pyrolysis can carried out in the conventional manner with fast pyrolysis preferred for high liquid yield, characterized by rapid heating of the biomass particles and a short residence time of product vapors (0.5 to 2 s). Rapid heating implies that it is preferable for the biomass to be ground into fine particles and that the insulating char layer that forms at the surface of the reacting particles must be continuously removed.

Pyrolysis is slightly endothermic and various methods have been proposed to provide heat to the reacting biomass particles, but the preferred method is circulating fluidized beds: biomass particles are introduced into a circulating fluidized bed of hot sand or other solids. Gas, sand and biomass particles move together, with the transport gas usually being a recirculated product gas, although it may also be a combustion gas. High heat transfer rates from sand ensure rapid heating of biomass particles and ablation is stronger than with regular fluidized beds. A fast separator separates the product gases and vapors from the sand and char particles. The sand particles are reheated in fluidized burner vessel and recycled to the reactor.

Alternative methods that may be considered for use for the pyrolysis include the auger technology adapted from the Lurgi process for coal gasification, the ablative processes in which biomass particles are moved at high speed against a hot metal surface, the rotating cone process in which pre-heated hot sand and biomass particles are introduced into a rotating cone. Due to the rotation of the cone, the mixture of sand and biomass is transported across the cone surface by centrifugal force. Like other shallow transported-bed reactors relatively fine particles are required to obtain a good liquid yield although none are as practicable as the circulating fluidized bed.

Crude biomass pyrolysis liquid or bio-oil is dark brown and approximates to biomass in elemental composition. It is composed of a very complex mixture of oxygenated hydrocarbons with an appreciable proportion of water from both the original moisture and reaction product. Compositionally, the biomass pyrolysis oil will vary with the type of biomass, but is known to consist of oxygenated low molecular weight alcohols (e.g., furfuryl alcohol), aldehydes (aromatic aldehydes), ketones (furanone), phenols (methoxy phenols) and water. Solid char may also be present, suspended in the oil. The liquid is formed by rapidly quenching the intermediate products of flash degradation of hemicellulose, cellulose and lignin in the biomass. Chemically, the oil contains several hundred different chemicals in widely varying proportions, ranging from formaldehyde and acetic acid to complex high molecular weight phenols, anhydrosugars and other oligosaccharides. It has an distinctive odor from low molecular weight aldehydes and acids is acidic with a pH of 1.5-3.8 (2.8) and is an irritant.

While the biomass begins with 10% to 15% moisture, the water content of the pyrolysis oil will typically range from about 15 wt % to an upper limit of about 30-50 wt %, depending on how the oil was produced and subsequently collected. The oxygen content is 40-50%, and only low levels of sulfur may normally be detected. The lower heating value is approximately 16-21 (17.5) MJ/kg. Pour point is typically −12° C. to −33° C., with no cloud point observable until −21° C. The carbon residue is 17-23% wt (0.13% ash). Although the flash point is 40-100° C., the oil is not auto-igniting in a diesel engine. The viscosity of the bio-oil as produced can vary from as low as 25 cSt to as high as 1000 cSt.

Pyrolysis oil can tolerate the addition of some water, but there is a limit to the amount of water which can be added to the liquid before phase separation occurs. In other words, the liquid cannot be dissolved in water. It is miscible with polar solvents such as methanol, acetone, etc. and although referred to as an oil, will not mix homogeneously with any hydrocarbon liquids. It can be considered as a micro-emulsion in which the continuous phase is an aqueous solution of holo cellulose decomposition products that stabilize the discontinuous phase of pyrolytic lignin macro-molecules through mechanisms such as hydrogen bonding, but is totally immiscible with petroleum-derived fuels. Aging or instability is believed to result from a breakdown of the emulsion structure, formation of hydrogen bonding interactions and chemical reactions of organic compounds present in the oil, e.g., phenols reacting with aldehydes to produce insoluble resin sediments.

The liquid oil from the pyrolysis contains many reactive species which lead to an increase in product viscosity in period of 12 months due to polymerization of these species. Pyrolysis liquids cannot be completely vaporised once they have been recovered from the vapor phase. If the liquid is heated to 100° C. or more in attempts to remove water (typically about 25% as produced) or distill off lighter fractions, it rapidly reacts and eventually produces a solid residue of around 50 wt % of the original liquid and some distillate containing volatile organic compounds and water.

Fast pyrolysis bio-oil has a higher heating value of about 17 MJkg$^{-1}$ as produced with the water that cannot readily be separated. The density of the liquid is very high at around 1.2 kg/liter compared to light fuel oil at around 0.85 kg/liter which equates to about 42% of the energy content of diesel or fuel oil on a weight basis, but 61% on a volumetric basis. Some characteristics of a typical wood-derived crude bio-oil are summarised in the table below.

| Property | Typical value |
|---|---|
| Moisture content | 20-30% |
| pH | 2.5 |
| Specific gravity | 1.20 |
| Elemental analysis | |
| C | 55-58% |
| H | 5.5-7.0% |
| O | 35-40% |
| N | 0-0.2% |
| Ash | 0-0.2% |
| HHV as produced | 16-19 MJ/kg |
| Viscosity (40° C., 25% water) | 40-100 cp |
| Solids (char) | −0.5% |
| Vacuum distillation residue | up to 50% |

In the present process, the biomass oil along with any residual particles of biomass which have been allowed to remain in the oil, is brought into contact with water and carbon monoxide under conditions of elevated temperature and pressure. Organic compounds, including any remaining lignocellulosic material, dissolve in the water and, once dissolved, the water will efficiently break cellulose and other bonds and then undergo hydrogenation reactions with hydrogen from the water released by the mediation of the carbon monoxide. Thus, the hydrogen content of the oil is increased without the necessity to generate hydrogen as a separate reactant.

Superheating the water to a temperature of at least 200 or 300° C. and preferably at least 374° C. is preferred for the present treatment. Appropriate pressures, typically at least autogenous will maintain the water in the liquid state and this is preferred in order to secure satisfactory reaction rates in the biomass reaction. Pressures at temperatures of this order will typically be at least 15 MPa (2175 psi) and may be at least as high as 20 MPa (2900 psi).

High temperature water under autogenic or higher pressure provides a significantly more favorable reaction medium for insoluble organic compounds than does water at temperatures up to its boiling temperature (at 1 bar). The solvent properties of liquid water (density, dielectric constant) at high temperature are similar to those of polar organic solvents at room temperature, thus facilitating the solubility of organic compounds and their reactions. At 300° C., for example, water exhibits a density and polarity similar to those of acetone at room temperature: the solubility parameter decreases from 23.4 to 14.5 cal/cm$^3$. The dielectric constant drops rapidly with temperature, and at 300° C. has fallen from 80 (at 20° C.) to 2. Therefore, as the water temperature is increased, the solubility of non-polar organic compounds increases much more than expected for the natural effect of temperature and the reactions with the biological materials are facilitated to this extent.

When superheated liquid water is used in the range from about 200° C. to below the critical temperature of water, 374° C., more preferably from about 250° C. to about 350 or 370° C., the pressures will be autogenous or higher. The corresponding vapor pressure needed to maintain water in the liquid state at these temperatures ranges from 1550 kPa (225 psi) at 200° C. to about 10.6 MPa (1532 psi) at 350° C. to about 22 MPa (3200 psi) at 374° C. Vapor pressure values are readily determinable by reference to standard texts such as the CRC Handbook of Chemistry and Physics and Steam Tables by J. H. Keenan, F. G. Keyes, P. G. Hill and J. G. Moore, Wiley-Interscience, New York, 1969 . . . .

When superheated to temperatures below the critical point, the water will remain in the liquid state rather than passing into the supercritical characteristic state in which the properties are intermediate those of the vapor state and the liquid. Above the critical point, (critical point for water is 374° C. and 22 MPa (3190 psi), at which it has a relative density of 0.322), supercritical fluids generally possess unique solvating and transport properties compared to liquids or gases. Supercritical fluids can have liquid-like densities, gas-like diffusivities, and compressibilities that deviate greatly from ideal gas behavior and under supercritical conditions, solid solubility often is enhanced greatly with respect to solubility in the gas or liquid solvent. Supercritical water in particular has the ability to dissolve materials not normally soluble in liquid water or steam and it also promotes certain chemical reactions. When heated above this point, the superheated water becomes supercritical and, as such, water has been found to be a preferred medium for the conversion of the oil.

Organic molecules containing oxygen functionalities such as are commonly found in biomass oil derived from lignocellulosic sources undergo a wide range of chemical reactions in neutral superheated or supercritical water. In superheated water, below the critical temperature of water, these reactions proceed mainly via ionic vs. thermal free radical pathways. Above the critical temperature, a competition between ionic and thermal free radical pathways would be expected, with radical pathways catching up and finally predominating as temperature increases. Condensation type polymers, polymers containing, e.g., ester, ether, and amide linkages are likely to be cleaved to their starting materials at 300° C. and above and esters, ethers, sulfides, amines and even diaryl ethers cleave rapidly, carboxylic acids are decarboxylated ($-CO_2$) and aldehydes are decarbonylated ($-CO$). Such reactions effect cleavage of cross-links containing oxygen, nitrogen and sulfur moieties with the concurrent loss of much of these heteroatoms. These as well as many others, are facilitated by changes in the chemical and physical properties of water as temperature increases.

Superheated water at 350° C. and ~2400 psi (Hydrothermal Liquefaction (HTL) conditions) is in the liquid state and will react with e.g., lignin, to hydrolytically cleave linkages such as those typically found in biomass materials, including ethers and esters (including carbonate esters) and amides. Under these conditions, ester linkages in the biomass pyrolysis oil which have survived the pyrolysis are cleaved into an acid and an alcohol; the acid formed is then decarboxylated with the water acting as an acid, base or acid-base bi-catalyst (-log Kw=11.3 vs. 13.99 at 25° C.). The alcohol dehydrates under the same conditions to form an olefin. Amide bonds which are present cleave to form amines and diols; the diols can subsequently dehydrate to olefins while the amines lose ammonia to form alkanes or olefins. These reactions are strongly catalyzed by the acidity of the water at high temperature and autocatalyzed by acidic reaction products. Depolymerization and deoxygenation of biomass are therefore efficient under these conditions to form a product, typically in the form of a viscous, oily mass which can subsequently be worked up as a precursor of liquid transportation fuels. Since the water soluble conversion products (i.e., hydrolysis products) may include acidic products, basic products, reducing agents and oxidizing agents, that effect further conversion and upgrading of the biomass resource material, recycle enrichment of these materials presents another viable processing option.

An increase in the dissociation constant by three orders of magnitude allows water at temperatures of 200° C. or higher to act as an acid, base, or acid-base bi-catalyst without the need for costly and cumbersome neutralization and catalyst regeneration steps. The negative logarithmic ionic product of water [pKw] at 250° C. is 11, as compared to 14 at 20° C., which means that water becomes both a stronger acid and a stronger base as the temperature increases. Therefore, in addition to the natural increase in kinetic rates with temperature, both acid and base catalysis by water are enhanced at higher temperatures. Accordingly the water/oil conversion may be carried out in the absence of any additional catalyst although trace amounts of acid can be added to facilitate these reactions while acidic species generated during the conversion process can autocatalyse the cleavage and deoxygenation reactions as described above. Also, since water soluble conversion products (i.e., hydrolysis products) may include acidic products, basic products, reducing agents and oxidizing agents, that effect further conversion and upgrading of the biomass resource material, recycle enrichment of these materials presents another viable processing option.

In the presence of the heated water and the carbon monoxide, the dissolved biomass pyrolysis oil is posited to enter into the following reaction steps:

$$CO + OH^- \rightarrow HCO_2^-$$

$$HCO_2^- + [\text{Biomass Oil}] \rightarrow [\text{Biomass Oil}]H^- + CO_2$$

$$[\text{Biomass Oil}]H^- + H_2O \rightarrow [\text{Biomass Oil}]H_2 + OH^-$$

Overall:

$$H_2O + CO + [\text{Biomass Oil}] \rightarrow [\text{Biomass Oil}]H_2 + CO_2$$

Thus, donatable hydrogen from the water is incorporated into the oil.

Depolymerization reactions may occur not only by the action of the superheated water but also by the mediation of the carbon monoxide. The potential role of the carbon monoxide in the depolymerization is not, however, well marked. The ability may be attributable to bond breaking activity or to the removal of potential cross-link sources which cause repolymerization to higher molecular weight products following hydrothermal bond rupture. The major depolymerization reactions are thought to be acid catalyzed, in which the superheated water acts as an acid catalyst. The acidic functionalities and acidic materials in the biomass oil components as well as soluble acidic products which are generated during the pretreatment may be effective in acting synergistically to enhance conversion. Small amounts of formic acid are formed by the reaction of carbon monoxide with water and the formic acid can act both as an acid catalyst and as a hydride ion donating reducing/hydrogenation agent. Since a significant proportion of the aqueous chemistry involved in the carbon monoxide treatment is believed to involve oxygen-containing substituents attached to aromatic ring systems, the aqueous CO treatment is especially effective with oils derived from oxygen rich lignocelluloses.

The reaction with the water can be carried out in a reactor with walls suitably thick to withstand the pressures generated and fitted with a gas/liquid circulation system to permit the continuous circulation of the superheated/supercritical water as well as removal of gases such as oxygen, carbon monoxide and carbon dioxide which are evolved in the various reactions. Typically, the reactor will allow for the contact times between the water and the pyrolysis oil mentioned above, following which the reaction mass is withdrawn from the reactor, the water separated for recirculation and the water and residue de-gassed. Any sludge-like residue which remains can be sent to a coker or burned as fuel for the process.

The water employed in the process is preferably neutral, i.e. about pH 7 and substantially free of dissolved oxygen to minimize the occurrence of undesirable free radical reactions. Certain weight ratios of water to organic resource material drive the reaction at faster rates. Therefore, a weight ratio of water to biomass oil (including any residual biomass) in the range from about 0.5 to about 10 is preferred, and more preferably from about 0.5 to 5.0, most preferably 0.5 to 2, most preferably above 1:1; the preferred ratios at reactor inlet are about 1.25:1 to 4:1, most preferably 1.5:1 to 2:1, and at least 1:1.

An added organic solvent, immiscible or miscible with water, may be employed to enhance dispersion and flowability of the oil and the reaction products. Suitable solvents may include alcohols such as ethanol, isopropyl alcohol, ketones, phenols, and carboxylic acids. The acids may also act as catalysts in the reaction mechanisms. By-products of the treatment, concentrated and accumulated in a recycle water stream are a readily available source of such organic compounds. The ratio of organic solvent-to-oil (dry basis) is preferably about 0.25:1 to 1:1.

The contacting is normally for a period of time ranging from about 0.1 second to several hours with shorter contact times being possible at higher temperatures; typically, contact times will be from 5 seconds to about 4 hours, and preferably 1 minute to 2 hours.

The treatment temperature may be expected to affect the quality of the reaction product. This effect may be a consequence of the thermodynamics of the treatment reaction system that in general tends toward dehydrogenation at higher temperatures so that the highest temperatures at which the reaction is kinetically favored may result in a deterioration of the product. Therefore, to some extent, the reaction temperature selected is a compromise between competing effects. Temperatures within the range of 250 to 400 C.° are likely to be suitable depending on the biomaterial used as feed. Within that range, there is a preferred range of about 280 to 350° C. A catalyst/promoter will allow the treatment reaction to proceed at a satisfactory rate at relatively lower temperatures but below 250° C., uncatalyzed/unpromoted pretreatment reactions are too slow. An alternative embodiment is to temperature stage the pretreatment reactions by initially maintaining the temperature in the above mentioned 250-400° C. range for part of the time and then increasing the temperature to a range between 350° to 425° C.

Carbon monoxide pressure is another treatment process parameter. Higher CO pressures probably directly affect the formate ion concentration in the reaction system by shifting the reaction equilibrium to the right as follows:

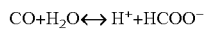

$$CO + H_2O \leftrightarrow H^+ + HCOO^-$$

There is a potentially increasing improvement in the reaction product properties with increasing CO partial pressure. A suitable range is 3 to 10 MPa (initial) at ambient temperature, preferably about 5 to 7 MPa. Total system pressure at reaction conditions (including $H_2O$ vapors, $CO_2$, $H_2$, CO, and $C_1$-$C_4$) is suitably in the range of about 12 to 30 MPa, preferably about 20 to 24 MPa, depending on the partial pressure of the CO and the temperature, which in turn determines the water partial pressure.

Generally, the quality of the reaction product improves with increasing residence time in the treatment. A suitable residence time at about 300° C. ranges from about 10 minutes to 5 hours, preferably, from an economic standpoint, 20 minutes to 2 hours, most preferably about 80 minutes.

Efficient mixing and good contact between the CO and water reactants and the biomass oil can be accomplished with a mechanical stirrer and/or with stationary baffles that create high turbulence, or properly designed inlet gas spargers that produced small gas bubbles.

Recycle of the aqueous phase to the reactor is an optional feature which can provide certain advantages. Recycle may aid in dissolution of the oil into the aqueous phase as a result of the alcohols, phenols, and carboxylic acids contained in the recycle solution; the acidic components in the aqueous recycle solution may also act as catalysts for the reactions in addition to the activity of the high temperature water. A recycle rate of 3:1 to 10:1 is suitable (ratio of recycle to makeup water).

It has been found that certain chemical compounds act as promotors to significantly increase the hydrogen to carbon (H/C) ratio of the treated oil. Suitable promoter compounds include sodium or calcium formate, acetic acid, sulfuric acid, sulfurous acid, carbon disulfide, hydrogen sulfide, sodium hydroxide, sodium carbonate, sodium bicarbonate, calcium iodide, formic acid, calcium hydroxide, calcium acetate, calcium oxide, sodium sulfite, ammonium sulfide, ammonium bisulfide, hydrogen sulfide and the like.

According to the chemistry proposed for the treatment, explained above, it is believed that an important active intermediate is the formate anion generated by the reaction of CO and water. Metal ions such as calcium, magnesium, sodium, lithium or potassium are believed to stabilize this formate anion by forming a formate salt. Formic acid and formate anion are believed to donate hydrogen via a hydride ion to the biomass oil and so, by increasing the concentration of formate ion in the system, the extent of hydrogenation of the oil may be increased. Acidic promotors such as acetic acid are believed to be capable of promoting the reaction chemistry by making available soluble metal ions from the biomass oil. Such acids are believed to ion exchange with metals such as calcium in the oil and form an equilibrium with calcium salts in solution. Such salts in turn ion-exchange with formic acid, which is thereby stabilized with metal cations to form a formate salt.

In view of the above, either acids or soluble metal salts of acids or bases can act as promotors. The most preferred promotors are ammonium salts and metal salts wherein the metal is in Group IA, Group IIA, or Group IIB of the Periodic Table, for example sodium or calcium formate and ammonium sulfide or bisulfide. Calcium or sodium hydroxide or oxides are also preferred. Other compounds may be preferred in certain process applications, for example CaO is low in cost and acetic acid is easily recovered. Process derived salts of acids and acids derived from the biomass have the advantage that at steady state they are potentially cost free. For example, calcium and sodium salts of acetic acid, formic acid, propionic acid, lactic acid and the like are made during the treatment and may be concentrated or accumulated in a water recycle stream to the treatment zone.

The promotors should be present in the treatment reaction system in the amount by weight of 0.5 to 10%, preferably 1 to 5%. However, certain low cost promotors, for example, ammonium bisulfide, ammonium sulfide or hydrogen sulfide, may be added in much higher amounts.

The fuels precursor which results from the reaction is characterized by a lower molecular weight and lower oxygen content than most biomass products and a higher hydrogen content derived from the water. This is a result of the unique conversion properties of the superheated/CO water system when applied to biological materials. Depolymerization results in the formation of liquid or semi-liquid products of varying viscosities which will combine with solids present in the mass to dissolve or disperse them and produce a rather viscous, reaction product which can be worked up in the same or similar manner to a petroleum crude following a filtration which is optional depending on how the product is eventually processed, of any remaining solids. For example, it may be used as coker feed, or visbreaker feed. Feed to an FCC unit is preferably hydrotreated to remove sulfur and nitrogen compounds which may remain and which, if not removed, will adversely affect catalyst performance and longevity in the cracking process. Hydrocracking is also an option.

The invention claimed is:

1. A process for the conversion of biomass pyrolysis oil into precursors for hydrocarbon transportation fuels which comprises contacting the biomass pyrolysis oil with either liquid superheated water at a temperature of at least 200° C. or supercritical water and carbon monoxide at elevated pressure to convert the oil into liquid transportation fuel precursors.

2. A process according to claim 1 in which the water is liquid superheated water at a temperature of at least 300° C.

3. A process according to claim 1 in which the biomass pyrolysis oil is produced by the pyrolysis of biomass comprising plant matter, biodegradable wastes, byproducts of farming including animal manures, food processing wastes, sewage sludge, black liquor from wood pulp or algae.

4. A process according to claim 3 in which the pyrolysis oil is produced by the pyrolysis of biomass comprising the roots, stems, leaves, seed husks and fruits of miscanthus, spurge, sunflower, switchgrass, hemp, corn (maize), poplar, willow, sugarcane, and oil palm (palm oil).

5. A process according to claim 1 which is carried out at a temperature of 280 to 350° C.

6. A process according to claim 1 which is carried out at a total system pressure of 12 to 30 MPa and a CO partial pressure from 5 to 10 MPa.

7. A process according to claim 1 which is carried out with a weight ratio of water:biomass oil from 0.5:1 to 5.0:1.

8. A process according to claim 1 in which the pyrolysis oil is produced by the pyrolysis of biomass at a temperature of 350 to 425° C.

9. A process according to claim 1 in which the biomass pyrolysis oil comprises an emulsion of 15-50 wt % non-separable water content.

10. A process according to claim 1 in which the biomass pyrolysis oil comprises an emulsion having an oxygen content of 40-50 wt. %.

11. A process for the conversion of a lignocellulosic biomass material into precursors for liquid hydrocarbon transportation fuels which comprises:

pyrolyzing biomass at a temperature from 300 to 500° C. in a reducing atmosphere to form a biomass pyrolysis oil, contacting the biomass pyrolysis oil with liquid superheated water and carbon monoxide at elevated temperature of 280 to 350° C., an elevated total system pressure of 12 to 30 MPa and a CO partial pressure from 5 to 10 MPa and a weight ratio of water:biomass oil from 0.5:1 to 5.0:1, to dissolve the biomass oil into the reaction mixture and depolymerize, deoxygenate and hydrogenate the oil and form a reaction product comprising liquid transportation fuel precursors.

12. A process according to claim 11 in which the pyrolysis oil is produced by the pyrolysis of biomass at a temperature of 350 to 425° C.

13. A process according to claim 11 in which the biomass pyrolysis oil comprises an emulsion of 15-50 wt % non-separable water content.

14. A process according to claim 11 in which the biomass pyrolysis oil comprises an emulsion having an oxygen content of 40-50 wt. %.

15. A process according to claim 11 in which the product of the reaction is separated to collect an aqueous stream comprising water-soluble reaction products of the biomass oil including acidic components which are effective catalytic promotors for the reaction, and recycling a portion of the stream to the reaction.

16. A process according to claim 15 in which the recycled aqueous stream includes formate anion.

17. A process according to claim 15 in which the catalytic promoter is present in the reaction in an amount from 0.5 to 10 weight percent of the reaction mixture.

* * * * *